(12) United States Patent
Brannan

(10) Patent No.: US 10,511,155 B1
(45) Date of Patent: Dec. 17, 2019

(54) CABLE CONNECTOR TOOL

(71) Applicant: Danny Brannan, Saraland, AL (US)

(72) Inventor: Danny Brannan, Saraland, AL (US)

( * ) Notice: Subject to any disclaimer, the term of this patent is extended or adjusted under 35 U.S.C. 154(b) by 185 days.

(21) Appl. No.: 15/708,184

(22) Filed: Sep. 19, 2017

(51) Int. Cl.
*H02G 1/12* (2006.01)
(52) U.S. Cl.
CPC ........... *H02G 1/1256* (2013.01); *H02G 1/127* (2013.01)
(58) Field of Classification Search
CPC .. H02G 1/1265; H02G 1/1248; H02G 1/1256; H02G 1/1295; H02G 1/127; H02G 1/12; G02B 6/245
See application file for complete search history.

(56) References Cited

U.S. PATENT DOCUMENTS

| | | | | |
|---|---|---|---|---|
| 2,376,858 A * | 5/1945 | Barrans | ................. | H02G 1/1214 30/179 |
| 2,480,107 A | 8/1949 | Baldwin et al. | | |
| 3,614,905 A * | 10/1971 | Bieganski | ............ | H02G 1/1265 30/90.1 |
| 3,782,227 A * | 1/1974 | Veenendaal | .......... | H02G 1/1295 81/9.51 |
| 3,810,289 A * | 5/1974 | Hannabery | ............ | H01R 43/00 29/56.6 |
| 4,327,609 A * | 5/1982 | Resch | .................. | H02G 1/1256 81/9.51 |
| 4,528,741 A | 7/1985 | Grimsby | | |
| 4,838,129 A * | 6/1989 | Cope | .................... | H02G 1/1256 29/566.4 |
| 4,958,433 A | 9/1990 | Persson | | |
| 5,265,339 A | 11/1993 | Nilsson | | |
| 5,342,218 A | 8/1994 | McMills et al. | | |
| D481,286 S | 10/2003 | Ahlgren et al. | | |

OTHER PUBLICATIONS

Rg6, Rg58 and Rg59 Rotary Coax Cable Stripper Is Suitable Excellent Item. Product listing [online]. © 2018 Rediff.com. [Retrieved on Jul. 3, 2017]. <URL:http://shopping.rediff.com/product/rg6--rg58-and-rg59-rotary-coax-cable-stripper-is-suitable-excellent-item/11889172?pos=alsoview_RT&rkey=855829&sc_cid=www.google.com%7Calsoview_RT>.

* cited by examiner

*Primary Examiner* — Robert J Scruggs
(74) *Attorney, Agent, or Firm* — Cramer Patent & Design, PLLC; Aaron R. Cramer

(57) ABSTRACT

A cable stripping tool is secured between a pair of planks in turn secured within a miter box. Each plank has a plurality of apertures which correspond to gauges of cable stripping sections disposed within the cable stripping tool.

6 Claims, 5 Drawing Sheets

CABLE CONNECTOR TOOL

RELATED APPLICATIONS

Not applicable

FIELD OF THE INVENTION

The present invention relates generally to a cutting and stripping tool for enabling cable connections.

BACKGROUND OF THE INVENTION

As anyone who performs a lot of physical work will attest, nothing beats having the proper tool for a job. The proper tool can save time, save money, produce a higher quality job, reduces damage to equipment, and provides for the increased safety of the worker. Each field of skilled trades work has its own type of specialty tools, each performing a specialized task.

One (1) area where there has been a need for such a specialized tool is that of preparation of cable used with solderless connectors. Such connectors are often used in the music industry for connecting effects pedals, musical instruments, amplifiers and microphones. While such connectors are quick to prepare and stand up to large amount of physical abuse, it is critical that the wire or cable is cleanly and accurately stripped in accordance with tight tolerances. When such stripping is done by hand, tolerances or the time taken quickly suffer.

Various attempts have been made to solve problems found in the cable cutting and stripping tool art. Among these are found in: U.S. Pat. No. 4,958,433 in the name of Persson; and U.S. Pat. No. 5,265,339 in the name of Nilsson. These prior art references are representative of such cable cutting and stripping art.

Accordingly, there exists a need for a means by cable used with solderless connectors can be quickly and accurately stripped in a concise manner. The development of the cable stripping tool fulfills this need.

SUMMARY OF THE INVENTION

In view of the foregoing references, the inventor recognized the aforementioned inherent problems and observed that there is a need for providing a safe, easy, and adaptable tool for safely cutting and/or stripping cables for subsequent connection or other uses. Such a tool includes a base having an aligning frame upstanding from the base, a depth cutoff frame upstanding from the frame, an access area defined between the aligning frame and depth cutoff frame, and a cutting and stripping assembly attached to depth frame.

To achieve the above objectives, it is an object of the present invention to provide such a plurality of alignment apertures on the aligning frame coaligned in a vertical disposition with a plurality of bores on the depth cutoff frame. Each of the coaligned pairs of individual apertures and bores have matching diameters capable of enabling a cable to pass therethrough. Each of the bores has different depths within the depth cutoff frame. In certain embodiments, there is indicia that corresponds to the type of coaligned pairs of apertures and bores.

Another object of the present invention is to have the plurality of apertures coaligned along a common horizontal centerline axis of the aligning frame. Similarly, the plurality of bores coaligned along a common horizontal centerline axis of the depth cutoff frame.

Yet still another object of the present invention is to provide such a cutting and stripping assembly to further include a movable arm, having a first end pivotally attached to the first side of the depth cutoff frame, a handle disposed on a second end of the movable arm, a cutting blade removably attached to a bottom portion of the movable arm, and an anvil affixed to the first side of the depth cutoff frame, subjacent the plurality of bores. In a preferred embodiment, the anvil further enjoys a plurality of slots, each located subjacent an individual one of the plurality of bores. An upper perimeter edge of the anvil is coaligned with a common centerline of a horizontal axis of said plurality of bores. In order to accomplish this, the slots of the anvil are configured to permit the passage of the selected amount of cables within selected ones of the plurality of bores.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
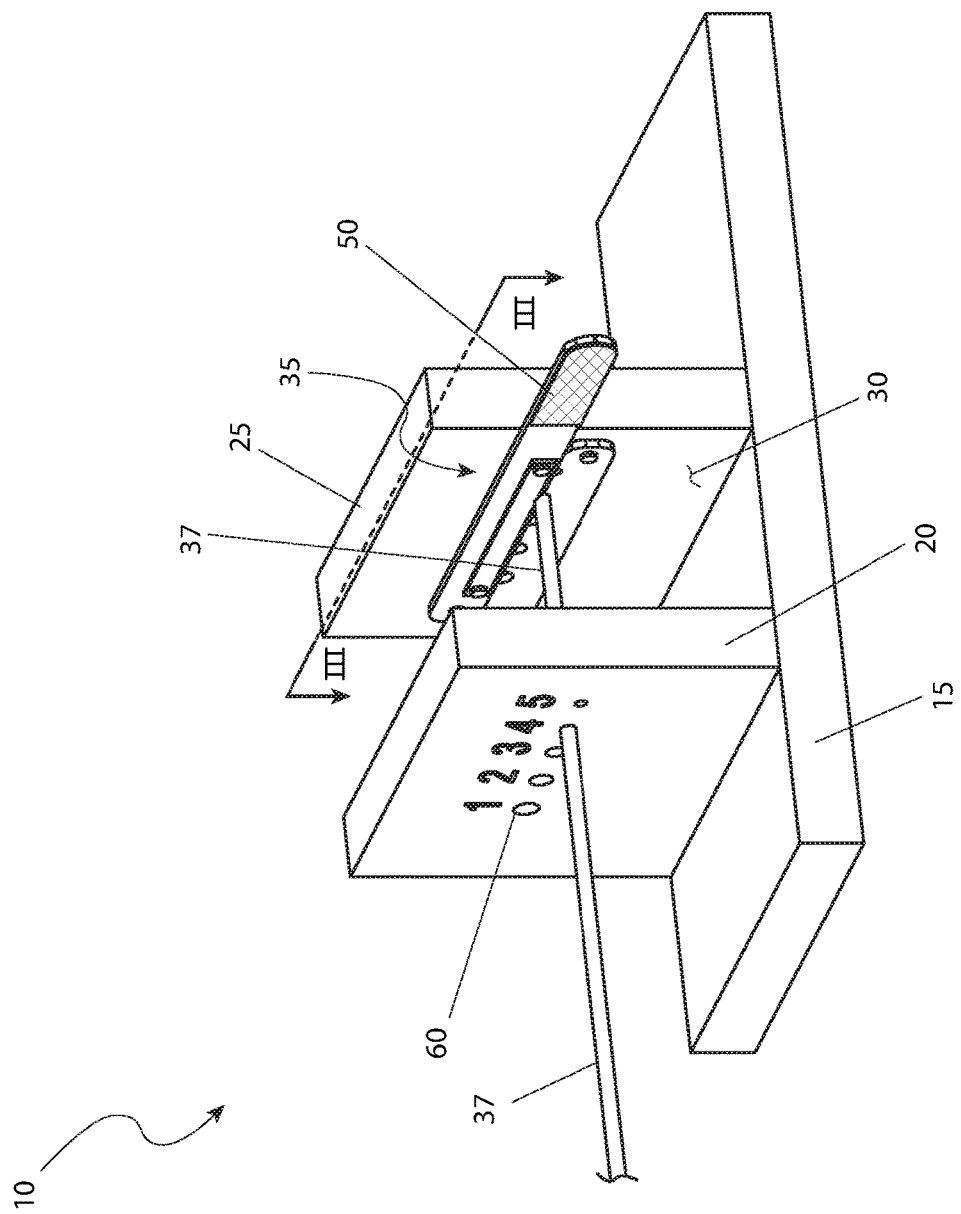
FIG. 1 is an overall perspective view of the cable stripping tool 10, according to the preferred embodiment of the present invention.

10 cable stripping tool
15 base plate
20 aligning frame
25 depth cutoff frame
30 access area
35 cutting/stripping mechanism
37 cable assembly
40 upper movable arm
45 pivot fastener
50 ergonomic handle
55 aligning frame first face
60 alignment aperture
65 numbered indicia
70 depth cutoff frame first face
75 fixed anvil
80 first fasteners
85 cutting alignment slot
90 arcing travel path
95 replaceable cutting blade
100 second fastener
105 bore

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, an overall perspective view of the cable stripping tool 10, according to the preferred embodiment of the present invention is disclosed. The cable stripping tool 10 (herein described as the "tool" 10), is designed for tabletop use. It is provided with a base plate 15 with the approximate dimensions of three inches (3 in.) wide, eight inches (8 in.) long and one-half inch (½ in.) thick. It is provided with an aligning frame 20 and a depth cutoff frame 25 arranged in a perpendicular manner Both the aligning frame 20 and the depth cutoff frame 25 are approximately three inches (3 in.) wide, two inches (2 in.) tall and one-half inch (½ in.) thick. An access area 30 is provided between the aligning frame 20 and depth cutoff frame 25 for removal of scrap wire and maintenance/repair of a cutting/stripping mechanism 35. Further description on the function and utilization of the aligning frame 20, the depth cutoff frame 25 and the cutting/stripping mechanism 35 will be provided herein below. It is envisioned that the base plate 15, the aligning frame 20, and the depth cutoff frame 25 would be made of plastic, although other materials such as steel or aluminum could be utilized with equal effectiveness, therefore, the material of construction used with the tool 10 is not intended to be a limiting factor of the present invention. A cable assembly 37 is shown inserted into the tool 10 where it is being sequentially striped and cut. Further detail on the usage of the tool 10 will be provided herein below.

Figure 2:
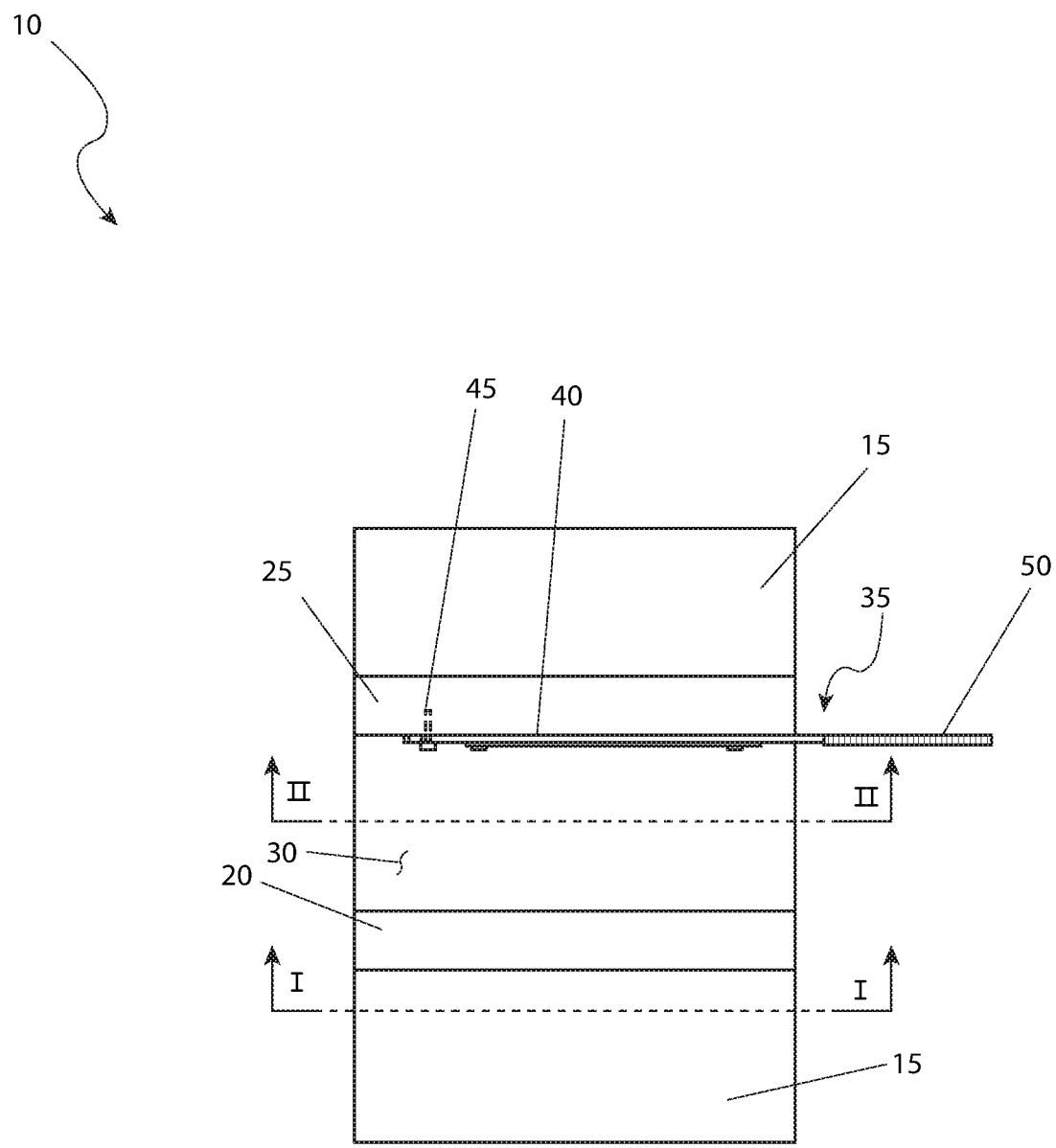
FIG. 2 is a top view of the cable stripping tool 10, according to the preferred embodiment of the present invention.

Referring next to FIG. 2, a top view of the tool 10, according to the preferred embodiment of the present invention is depicted. This figure clearly depicts the relationship between the aligning frame 20 and the cutting/stripping mechanism 35 attached to the depth cutoff frame 25 and base plate 15 and the resultant access area 30 between the aligning frame 20 and the cutting/stripping mechanism 35. An upper movable arm 40 (as part of the cutting/stripping mechanism 35, as shown in FIG. 1) is attached to the depth cutoff frame 25 by use of a pivot fastener 45 such as a screw. The opposite end of the upper movable arm 40 is provided with an ergonomic handle 50 for ease of use.

Figure 3:
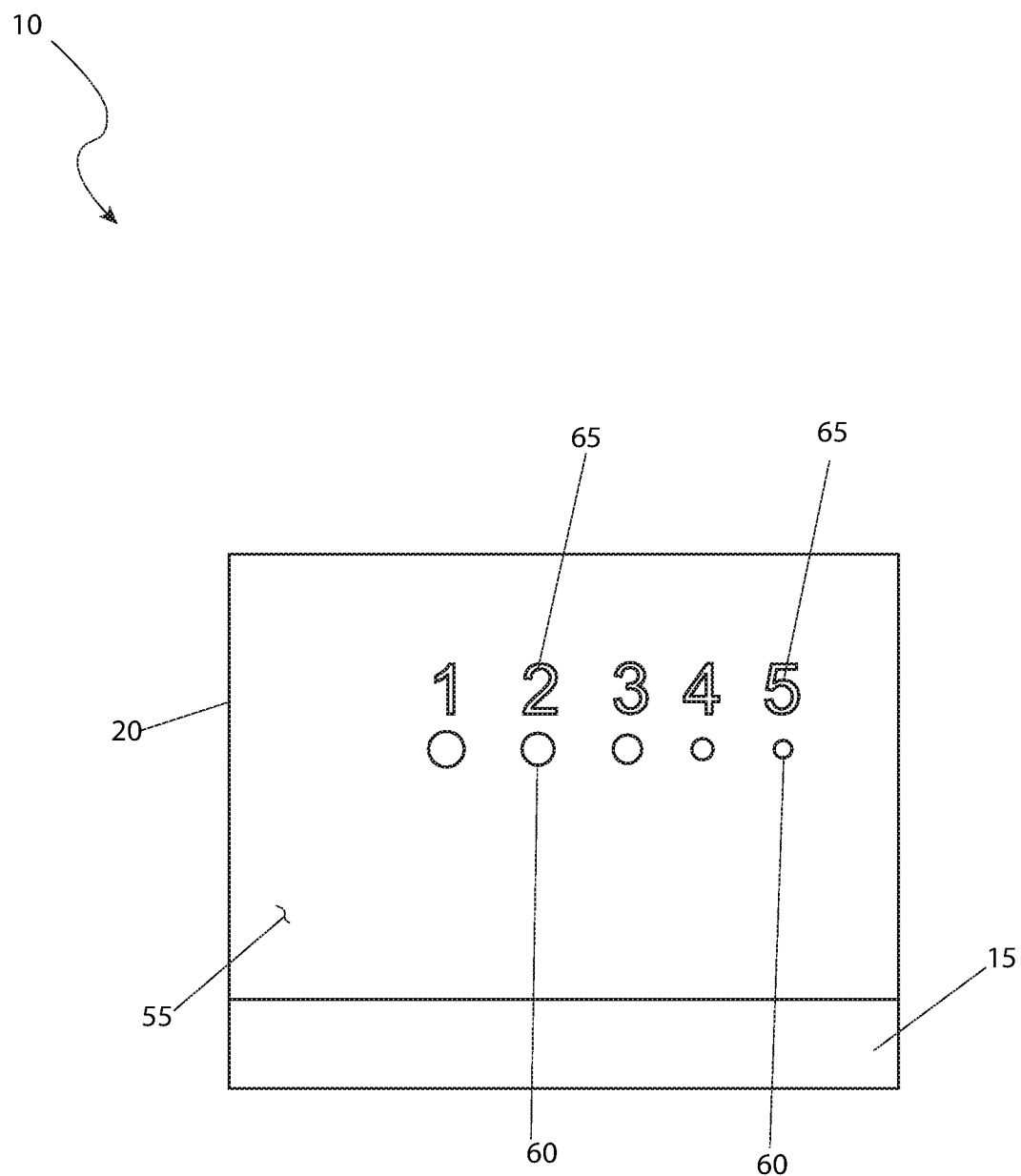
FIG. 3 is a sectional view of the cable stripping tool 10, as seen along a line I-I, as shown in FIG. 2, according to the preferred embodiment of the present invention.

Referring now to FIG. 3, a sectional view of the tool 10, as seen along a line I-I, as shown in FIG. 2, according to the preferred embodiment of the present invention is shown. The aligning frame 20 is provided with a series of multiple alignment apertures 60 which are routed completely through the aligning frame 20 and exit the opposite side. A total of five (5) are depicted in FIG. 3, although more or fewer could be utilized with equal effectiveness, and thus the total quantity of alignment apertures 60 utilized should not be interpreted as a limiting factor of the present invention. The alignment apertures 60 are of varying diameter and are envisioned to range from a larger to smaller diameter in an incremental fashion as arranged as shown in a left-to-right manner. Each of the alignment apertures 60 is provided with corresponding numbered indicia 65 located on the aligning frame first face 55 (the side opposite the access area 30) to permit for instructional use in a sequential or staggered manner. The various diameters of the alignment apertures 60 are intended to align with outer cable diameters, inner jackets sheaths, shields, inner insulators, inner or center conductors, and the like. It is envisioned that the diameters offered by the alignment apertures 60 and thus each respective model of tool 10 would vary per the intended application. Specific applications envisioned, but not limited to: include audio cables, electronic instrument cables, radio frequency (RF) cables, computer cables, video cables, power cables, speaker cables, control cables, and the like. Additionally, the tool 10 can be used with soldered cable connectors or solderless cable connectors, including but not limited to "Lava Cable Connectors"®. Specific cable types and/or specific diameters can be used with various models of the tool 10 designed for each use.

Figure 4:
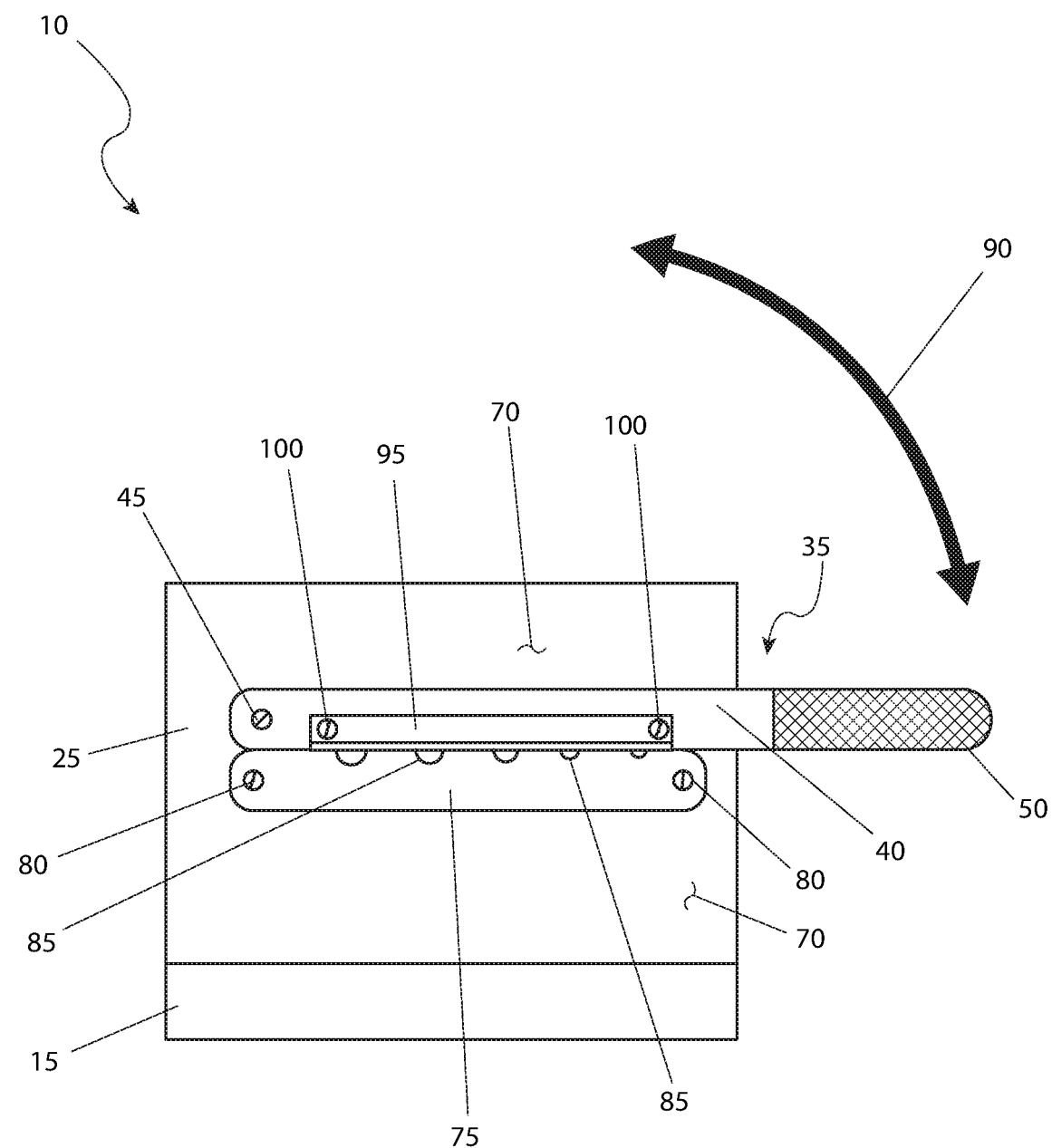
FIG. 4 is a sectional view of the cable stripping tool 10, as seen along a line II-II, as shown in FIG. 2, according to the preferred embodiment of the present invention; and, FIG. 5 is a sectional view of the cable stripping tool 10, as seen along a line III-III, as shown in FIG. 1, according to the preferred embodiment of the present invention.

Referring next to FIG. 4, a sectional view of the tool 10, as seen along a line II-II, as shown in FIG. 2, according to the preferred embodiment of the present invention is disclosed. The base plate 15 is visible along with a depth cutoff frame first face 70 of the depth cutoff frame 25. A fixed anvil 75 is fastened to the depth cutoff frame first face 70 using first fasteners 80 such as screws. A series of cutting alignment slots 85 are provided on the upper edge of the fixed anvil 75. The cutting alignment slots 85 match in quantity and location to the alignment apertures 60 (as shown in FIG. 3). The upper movable arm 40 is mounted immediately above the fixed anvil 75 where it is held in place by the pivot fastener 45 as aforementioned described. This positioning of the upper movable arm 40 allows for movement along an arc defined by an arcing travel path 90 as the ergonomic handle 50 is moved by the hand of the user about the pivot fastener 45. A replaceable cutting blade 95 such as a razor blade, is attached to the upper movable arm 40 by two (2) second fasteners 100 such as machine screws. Such a feature allows for the partial cutting of jackets, insulation, filler, shields, insulators, conducts and the like when a cable assembly is contained within a particular cutting alignment slots 85; the upper movable arm 40 is in a down position (as shown in FIG. 4) and the cable assembly rotated about three hundred sixty degrees (360°). The upper movable arm 40 is in an up position during placement or removal of the cable.

Figure 5:
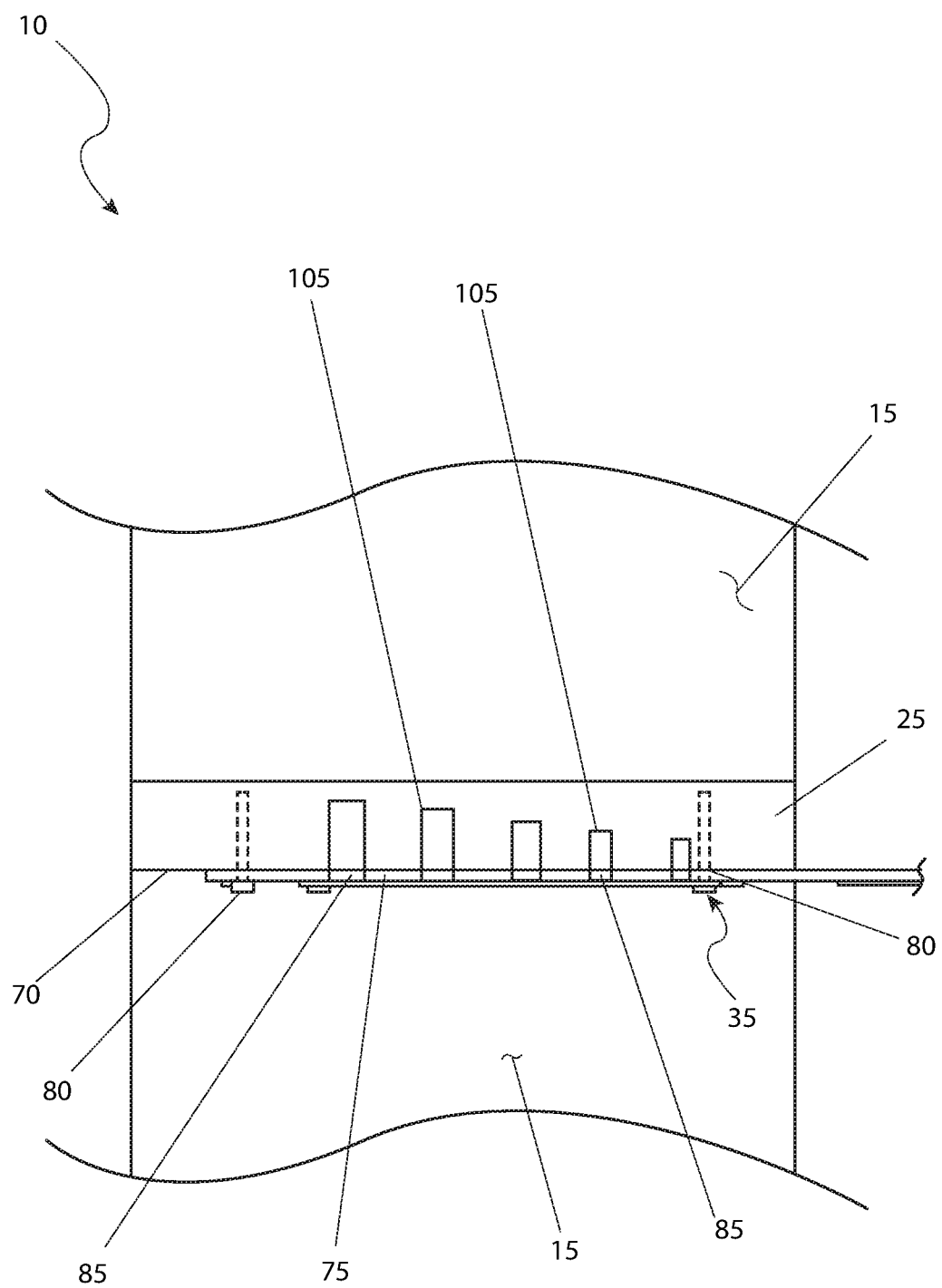

Referring finally to FIG. 5, a sectional view of the tool 10, as seen along a line III-III, as shown in FIG. 1, according to the preferred embodiment of the present invention is depicted. The depth cutoff frame 25 is provided affixed to the base plate 15. The fixed anvil 75 is affixed to the depth cutoff frame first face 70 by the first fasteners 80 such as screws. The cutting alignment slots 85 provided on the fixed anvil 75 then aligned with a series of bores 105 provided in the depth cutoff frame 25. It is noted that each of the bores 105 are of a differing depth depending on the needs of the specific cable layer structure to stripped and/or cut for removal. A longer depth bore 105 would be used for overall jacket removal, while a shorter depth bore 105 would be used for inner conductor stripping and/or cutting. Once again, each specific depth of cut would be specific for the type of cable upon which the tool 10 is intended for use. The specific depth dimension of the bores 105 is not intended to be a limiting factor of the present invention.

The preferred embodiment of the present invention can be utilized by the common user in a simple and effortless manner with little or no training. It is envisioned that the tool 10 would be constructed in general accordance with FIG. 1 through FIG. 5. The user would procure the tool 10 in accordance with the specific type, size, and style of cable to be striped and cut.

It is envisioned that specific cable or connector manufacturers would produce a specific tool 10 for each cable or connector. One (1) specific type of tool 10 could be utilized with a family of cables or connectors with multiple alignment apertures 60. As aforementioned described, the exact quantity of alignment apertures 60 along with respective cutting alignment slots 85 and bores 105 would match in each respective embodiment, however, overall design of the tool 10 may vary with total available openings.

After procurement and prior to utilization, the cable stripping tool 10 would be prepared in the following manner: a selection of cable assembly 37 to be prepared would be selected, a connector for placement on the prepared cable assembly 37 would be selected, an instructional sheet of which numbered indicia 65 would be referenced; and the tool 10 placed on a suitable workbench, table, or other surface.

During utilization of the cable stripping tool 10, the following procedure would be initiated: the upper movable arm 40 lifted into an upper position; the cable assembly 37 placed into an alignment apertures 60 as guided by instruction reference; the cable assembly 37 then routed beyond the cutting alignment slots 85 of the fixed anvil 75 and firmly seated against the bottom of the respective bores 105; the upper movable arm 40 lowered until the replaceable cutting blade 95 contacts the fixed anvil 75 and is held in place with one hand; the other hand then rotates the cable assembly 37 axially three hundred sixty degrees (360°) until the respective cable layer is completely cut circumferentially; the upper movable arm 40 raised; the cable assembly 37 removed from the tool 10; and the stripped cable layer removed. This process would then repeated for each subsequent cable layer such as inner jacket layer, shield layer, insulation layer, filler layer, inner conductor and the like by placement in a subsequent alignment apertures 60 and cutting alignment slots 85 as directed by instructional reference using the numbered indicia 65 as a guide. When completed, the user is provided with a cable assembly 37 that is striped in a stepped manner ready for insertion and connection into a soldered or solderless connector.

After use of the cable stripping tool 10, it is cleaned of any cable fragments that collect in the access area 30 and stored until needed again in a cyclical manner. The replaceable cutting blade 95 may be replaced when worn depending on frequency of usage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A connection tool, comprising:
a base plate;
an aligning frame having a first end affixed to a first surface of said base plate;
a plurality of alignment apertures located on said aligning frame;
a depth cutoff frame having a first end affixed to said first surface of said base plate, parallel to said aligning frame;
an access area defined between said aligning frame and said depth cutoff frame;
a cutting and stripping assembly affixed to a first side of said depth cutoff frame, facing said access area;
a plurality of bores located on said depth cutoff frame first side, each of said bores are aligned with an individual one of said alignment apertures, and each extending into said depth cutoff frame at a specific depth; and,
wherein said alignment apertures are each configured to permit the passage of a selected amount of cables therethrough, each of said alignment apertures are provided with a plurality of corresponding numbered indicia located on said aligning frame first face to permit for instructional use in a sequential or staggered manner, each said corresponding numbered indicia positioned above said alignment apertures;
wherein said bores are each configured to permit the insertion of said selected amount of cables therethrough; and,
wherein said cutting and stripping assembly is positioned to fully provide a selected cutting or stripping means to said selected amount of cables through coaligned pairs of said apertures and said bores;
wherein said cutting and stripping assembly further comprises:
an upper movable arm having a first end pivotally attached to said depth cutoff frame first side;
a handle disposed on a second end of said upper movable arm;
a replaceable cutting blade removably attached to a bottom portion of said upper movable arm; and,
a fixed anvil affixed to said depth cutoff frame first side, said fixed anvil is subjacent said bores further having a plurality of slots, each said slots are located subjacent each one of said bores;
wherein said fixed anvil is configured to permit the passage of said selected amount of cables within selected ones of said bores;
wherein said bores each has a different depth; and
wherein an upper perimeter edge of said fixed anvil is coaligned with a common centerline of a horizontal axis of said bores.

2. The tool of claim 1, wherein said base plate is three inches in width, eight inches in length and one-half inch in thickness.

3. The tool of claim 1, wherein said aligning frame and said depth cutoff frame are each three inches in width, two inches in length, and one-half inch in thickness.

4. The tool of claim 1, wherein:
said alignment apertures each have a first different diameter; and,
said bores each have a second different diameter, such that a first different diameter and a second different diameter of coaligned pairs of alignment apertures and bores are generally identical.

5. The tool of claim 4, wherein:
said alignment apertures are coaligned along a first common centerline of a horizontal axis; and,
said bores are co aligned along a second common centerline of a horizontal axis.

6. The tool of claim 5, wherein said alignment apertures and said bores are arranged sequentially from a coaligned first alignment aperture and first bore having a first largest diameter at a first position on said aligning frame and said depth cutoff frame, respectively, to a last alignment aperture and last bore having a smallest aperture at a last position on said aligning frame and said depth cutoff frame, respectively.

* * * * *